(12) United States Patent
Dorn et al.

(10) Patent No.: US 6,314,358 B1
(45) Date of Patent: Nov. 6, 2001

(54) BRAKE CONTROL FOR VEHICLES, ESPECIALLY FOR RAIL VEHICLES AND A METHOD FOR CONTROLLING VEHICLE BRAKES

(75) Inventors: Wolfgang Dorn; Alfons Mayer, both of München (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 09/601,640

(22) PCT Filed: Feb. 5, 1999

(86) PCT No.: PCT/EP99/00790

§ 371 Date: Aug. 4, 2000

§ 102(e) Date: Aug. 4, 2000

(87) PCT Pub. No.: WO99/39957

PCT Pub. Date: Aug. 12, 1999

(30) Foreign Application Priority Data

Feb. 5, 1998 (DE) .............................. 198 04 570

(51) Int. Cl.$^7$ ........................................ B06T 8/30
(52) U.S. Cl. ................ 701/70; 701/20; 701/93; 701/79; 303/20; 303/138; 180/170
(58) Field of Search .................... 701/70, 79, 93, 701/20; 180/170; 303/20, 138

(56) References Cited

U.S. PATENT DOCUMENTS

| 3,717,384 | * | 2/1973 | Harned | 303/194 |
| 4,384,695 | * | 5/1983 | Nohmi et al. | 246/182 B |
| 4,401,035 | * | 8/1983 | Spigarelli et al. | 105/61 |
| 4,743,072 | * | 5/1988 | Brearley | 303/15 |
| 5,018,689 | * | 5/1991 | Yasunobu et al. | 246/182 B |
| 5,209,551 | * | 5/1993 | Wood et al. | 303/7 |
| 5,483,452 | * | 1/1996 | Tanaka | 701/70 |
| 5,501,512 | * | 3/1996 | Hart | 303/15 |
| 5,575,542 | * | 11/1996 | Tanaka et al. | 303/125 |
| 6,045,199 | * | 4/2000 | Toyoda | 303/159 |
| 6,099,085 | * | 8/2000 | Eckert | 303/3 |
| 6,167,979 | * | 2/2001 | Taylor et al. | 180/170 |

* cited by examiner

Primary Examiner—William A. Cuchlinski, Jr.
Assistant Examiner—Olga Hernandez
(74) Attorney, Agent, or Firm—Barnes & Thornburg

(57) ABSTRACT

A vehicle brake control wherein a driver generated braking prompt signal is compared with a measured deceleration signal and, according to which, a correction signal is generated. The correction signal is processed with the braking prompt signal into an output signal. The correction signal is constantly maintained over one or more clock pulses when the value of the deceleration signal lies within a given value range or tolerance band. However, the correction signal is changed from one plus to the next when the instantaneous deceleration lies outside said tolerance band.

19 Claims, 2 Drawing Sheets

BRAKE CONTROL FOR VEHICLES, ESPECIALLY FOR RAIL VEHICLES AND A METHOD FOR CONTROLLING VEHICLE BRAKES

BACKGROUND AND SUMMARY OF THE INVENTION

The invention relates to a brake control and method for controlling brakes in response to a drive defined braking prompt signal.

A device of this type is shown in U.S. Patent Document U.S. Pat. 4,743,072. A brake pressure regulating device for vehicles is described, in which, by way of a brake value generator, the driver defines a braking prompt signal or a desired vehicle deceleration and the actual vehicle deceleration is measured by wheel sensors. The regulating device has a correction value device which, in the event of a deviation between the braking prompt signal and the measure vehicle deceleration, modifies the brake pressure control such that the vehicle deceleration prompted by the driver is reached. This is a classic continuous regulating, in which case several channels are provided for the individual regulating of the deceleration of individual wheels.

U.S. Patent Document No. 4,805,105 describes a pressure control device for road vehicles, in which a regulating intervention takes place only if the difference between the brake pressure prompted by the driver and the actually existing brake pressure is outside a defined range.

European Patent Document EP 0,630,788A1 describes an electronic brake pressure control device for a multi-axle road vehicle, in which load sensors are provided and the brake pressure is regulated as a function of measured axle loads.

U.S. Patent Document U.S. Pat. No. 5,501,512 describes a device for calibrating pressure measuring transducers of an electro-pneumatic brake control of towing vehicles;

When braking vehicles and vehicle trains, the driver, by way of a brake pedal or a brake lever, normally defines a desired value of a brake force or of a desired vehicle deceleration (so-called braking prompt). However, the actual vehicle deceleration on the basis of this braking prompt depends on a plurality of parameters which are not known to the driver, such as the condition of the brake system, the loading of the vehicle, the slope of the road (gradient), the adhesion value between the road and the wheels, etc. For example, in the case of streetcars, it has therefore been attempted to regulate the brake system, the braking prompt was the desired value and the measured actual vehicle deceleration was the actual value of the regulating. However, this resulted in numerous difficulties. A main problem arose because when actuators of rail vehicle brake systems are operated, relatively long dead times occur. In which, in the case of streetcars the dead times are typically in the range of 0.7 seconds. In addition, a relatively long time period (pressure buildup time) is required for building up the braking force which is typically in the range of 1 second.

Because of the inertia of such brake systems and because of diverse natural frequencies of undercarriages and other vehicle components, regulated braking operations can cause considerable jerking within the train formation, which is extremely undesirable. Thus, because of the above-mentioned difficulties, a stable regulating with a feedback in the classic sense, that is, with a continuous signal feedback, is hardly possible.

Another difficulty, which stands in the way of a classic regulating, is that, when the actual value of the vehicle deceleration is defined by differentiating rotational wheel speed signals, which are supplied, for example, by inductive wheel sensors, relatively high percentage-related errors can occur These errors are the result of the scan timing and which, in the case of streetcars, are typically in the range of 100 milliseconds. These errors present an additional difficulty with respect to mastering the regulating.

It is therefore an object of the invention to provide a brake control and a method by means of which a stable braking can be implemented according to the braking prompt defined by the driver in the case of arbitrary parameters influencing the braking.

This object is achieved by the present invention.

The basic principle of the invention consists of arranging a regulating system behind the control, which regulating system will intervene by means of a correction signal only if the deviation between the braking prompt (as a desired deceleration signal) and the actual deceleration of the vehicle is outside a defined range. The corrected brake prompt signal will then be constant for the further control as long as the above-mentioned deviation is within the defined range. A change of the correction signal will not be effective until the above-mentioned deviation is outside the defined range.

The correction signal will be kept constant for one or several clock pulses as long as the difference between the "instantaneous deceleration signal" and the desired deceleration signal is within a defined value range. In contrast, the correction signal is changed from one clock pulse to the next when the instantaneous deceleration is outside this "tolerance band".

In a classic analog control or a conventional digital control, in which, during the entire regulating operation, a control variable is continuously fed back and processed. In the case of the signal processing according to the invention, the instantaneous deceleration, which can be understood to be the control variable, will be processed, that is, used for generating the correction signal, only when the difference between the desired deceleration signal and the instantaneous deceleration, which can be understood to be the "regulating deviation", with respect to its amount becomes too large, that is, is outside the tolerance band. When, in contrast, the regulating deviation is so small that the difference is within the tolerance band, the instantaneous deceleration is not processed and the correction signal is maintained unchanged.

Since the "regulating intervention" takes place only in the case of larger deviations and otherwise the control is unregulated, the initially mentioned dead times and pressure buildup times can be mastered better.

In addition, existing brake systems can be retrofitted with a brake control according to the invention without having to change mechanical components of the existing brake system.

The invention can be implemented as a hardware solution in the form of an electronic circuit as well as a software solution in the form of a computer program for a program-controlled processor or as a combination of the two solutions. Particularly a software-type implementation allows a very cost-effective adaptation of the existing brake control to a certain vehicle and to certain application conditions.

According to the invention, a measured "course" of time-discreet instantaneous deceleration signals calculated from speed signals is smoothed.

According to a further development of the invention, a measured "course" or a "course" of time-discrete instantaneous deceleration signals is smoothed. This takes place in that a smoothed instantaneous deceleration signal is formed from an actual measured value, which represents the instantaneous deceleration of the vehicle, and from measured values of preceding clock pulses. The smoothing takes place by a special filtering where in a number of successively taken measured values are weighted differently and a weighted average value is formed from these weighted measured values. In this case, the weighting is defined such that the measured values which, with respect to time, are close to the actual measuring point in time are weighted higher than the measured values which are more remote with respect to the time. In contrast to a frequency filtering, for example, by means of a low-pass filter, no signal transformations are therefore obtained in the time range. By such a smoothing of the course of the deceleration signal, errors can be reduced which are made during the measuring or during the calculation of the individual time-discrete instantaneous decelerations. On the whole, this results in a smoother course of the correction signal and therefore in braking operations with fewer jolts.

According to a further development of the invention, a "correction signal gradient" formed by two successive correction signals, in the event of the exceeding of or the falling below a defined positive or negative maximal gradient, is limited to this maximal gradient. This has the advantage that deceleration jolts and resulting force impulses at the vehicle or within a vehicle formation during the braking operation are further minimized. This reduces the mechanical stress.

Other objects, advantages and novel features of the present invention will become apparent from the following detailed description of the invention when considered in conjunction with the accompanying drawings.

DETAILED DESCRIPTION OF THE PREFFERED EMBODIMENT

Figure 1:
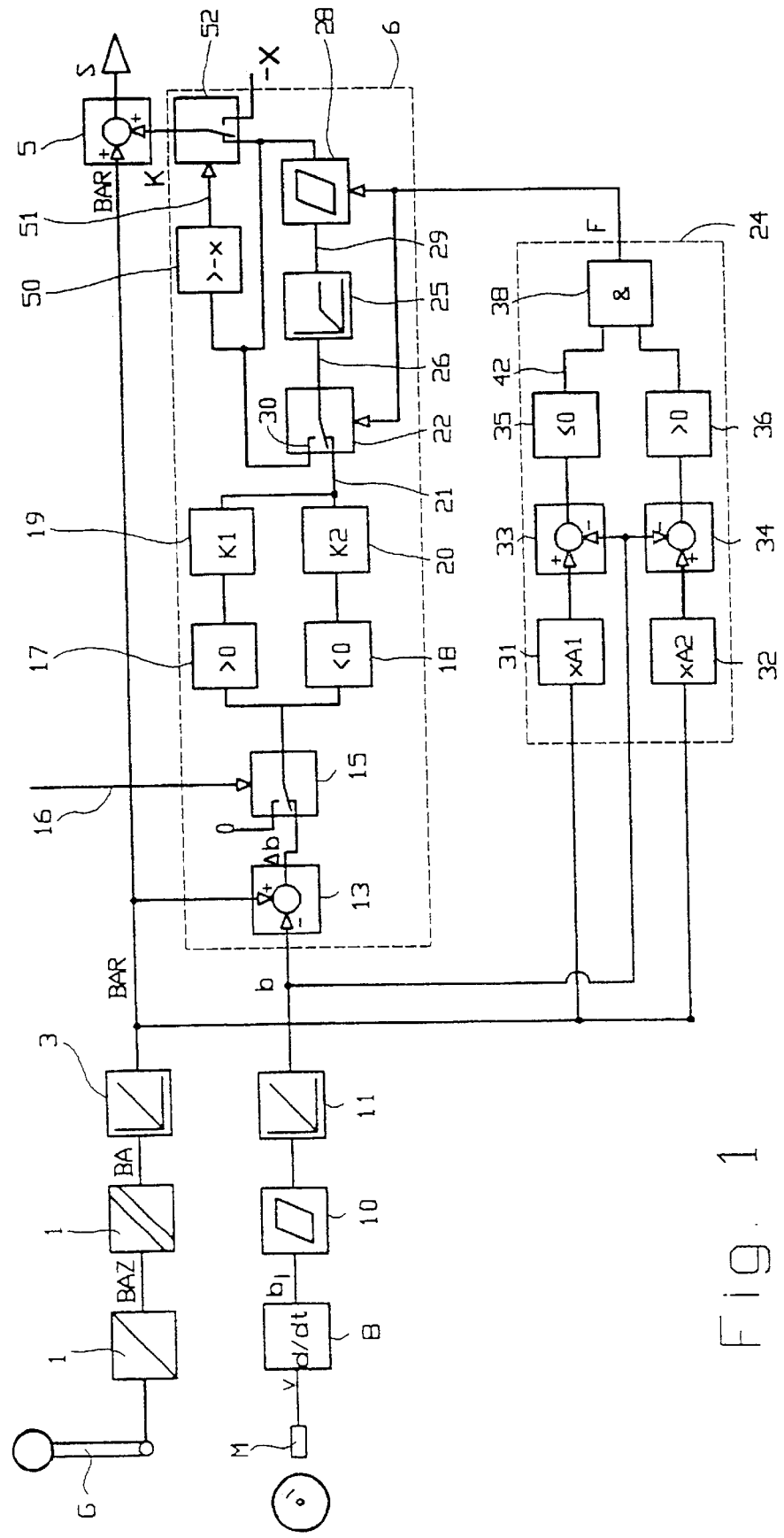
FIG. 1 is a block diagram of a brake control according to the invention.

In FIG. 1, a generator G, which may, for example, be a brake lever, generates a mechanical signal which, by means of an electromechanical converter 1', is converted to an analog electrical braking prompt signal BAZ for the train unit and which represents a desired deceleration of the vehicle to be braked which was requested by the driver. This braking prompt signal BAZ is supplied by way of a signal converter 1 with an integrated A/D converter as a digital signal BA to a jolt limiting circuit 3. Jolt limiting circuit 3 the rising and falling gradient of the signal BA and emits a "filtered" braking prompt signal BAR. If the signal BAZ defined by the drivers changes, for example, in the event of an abrupt initiating of a full braking or a sudden release of the brake, the jolt limiting circuit 3 can charge its output signal BAR within a defined time interval, for example, a clock pulse, only by a defined value in comparison to the previous clock pulse. This filtered braking prompt signal BAR is the "normal" output signal of the control which is supplied to actuating elements of the brake. In the case of the present invention, this signal or linking device is modified when certain operating conditions occur. An adder 5 is provided for this purpose, to whose one input the signal BAR is supplied and to whose other input a correction signal K is supplied. The output of the adder 5 then supplies the control signal S supplied to the actuating elements of the brake.

The correction signal K is generated in a subordinate control circuit. For this purpose, by measuring the rotational speed of one or several wheels of the vehicle, a measuring sensor M detects a signal v, which represents the instantaneous speed of the vehicle and which is differentiated with respect to time in a differentiator 8, to obtained a signal b which represents the vehicle acceleration or deceleration. This signal $b_1$—which, in the following, will be called "deceleration signal"—is intermediately stored in a memory element 10. The memory element 10 can store several successive measured values, such as four or five successive deceleration signals.

The deceleration signal measured at the actual point in time and several deceleration signals of previous clock pulses determined during preceding measurements and stored in the memory element 10 are supplied to a filter element 11 and are "filtered" by it.

The filter element 11 is a digital numerical filter which, in general terms, carries out only an amplitude standardization of successive deceleration signals but no frequency filtering and thus smoothes the time behavior of the signal course formed by the deceleration signals. The basic principle of this filter consists of the fact that the actual deceleration value is multiplied by a relatively high weighting factor, while the deceleration values of the preceding measurements are multiplied by smaller weighting factors. The individual multiplied values are added up and are divided by the sum of the individual weighting factors. This relationship is defined in the following calculation formula:

$$Fj = \frac{G_0 b_0 + G_{-1} b_{-1} + \ldots + G_{-n} b_{-n}}{b_0 + b_{-1} + \ldots + b_{-n}}$$

$$Fj = \frac{\sum_{i=-n}^{0} G_i b_i}{\sum_{i=-n}^{0} b_i}; i, j, n \in N$$

wherein $F_j$ is a deceleration signal smoothed by the filter element 11 at the point in time j, which deceleration signal corresponds to the smoothed signal b of FIG. 1. $F_j$ is calculated from individual deceleration values $b_i$, wherein $b_0$ corresponds to the value of the instantaneous deceleration signal of the actually considered clock pulse, $b_{-1}$ corresponds to that of the preceding clock pulse, etc. The factors $G_i$ are weighting factors which are indexed corresponding to the deceleration values $b_i$, wherein the following applies here: $G_i > G_{i-1}$. Thus, the "past" has a lower weight than the "present" but nevertheless causes a smoothing, so that undesirable peaks are avoided in the deceleration signal b.

For the purpose of a clarification, a concrete calculation formula will be indicated in the following, in which, in addition to the instantaneous deceleration signal $b_0$, four values preceding it are taken into account and are weighted corresponding to their succession in time by means of weighting factors 1 to 5.

$$F = \frac{5 b_{-0} + 4 b_{-1} + 3 b_{-2} + 2 b_{-3} + 1 b_{-4}}{5 + 4 + 3 + 2 + 1}$$

When filtering functions are used in which the arguments $b_{-i}$ occur linearly, it is possible to arrange the filtering element before the differentiator 8, that is, to first filter speed signals v and to differentiate subsequently.

The smoothed deceleration signal b is supplied to a subtracter 13 and is subtracted there from the filtered braking prompt signal BAR. By way of a switch 15, the thus generated differential signal Δb is supplied to two comparators 17 and 18. The switch 15 is used for switching off the control circuit, which is arranged on the output side via input 16, at certain operating. The conditions may be example, when there is a falling below a defined minimum speed of the vehicle; at certain locking conditions, for example, when all wheels of the vehicle have the tendency to lock; when the blocking brake is engaged, etc. In the normal condition, the switch 15 is in the illustrated ON-position.

The comparators 17 and 18 are each followed by multipliers 19 and 20. The arrangement of the comparators 17 and 18 and of the multipliers 19 and 20 provide different regulating amplifications for positive and negative deviation signals Δb. Comparator 17 therefore allows only a signal Δb to pass which is >0, while comparator 18 allows only a signal Δb to pass which is <0. In the multipliers 19 and 20, the correspond-ing signals are then multiplied by the different factors K1 and K2. If signal Δb is exactly 0, the two comparators 17 and 18 are blocked; a "regulating intervention" is not necessary. The output signals of the multipliers 19 and 20 are supplied to a common 21 connection of a switch 22, which is controlled by a logic signal F of a window comparator 24. The output 26 of switch 22 is supplied to a gradient limiting circuit 25. The output signal 29 of the gradient limiting 25 is stored in memory 28 which is controlled by logic signal F.

The filtered braking prompt signal BAR and the smoothed deceleration signal b are supplied to the window comparator 24. The braking prompt signal BAR is multiplied in a first multiplier 31 by a factor A1 and in a second multiplier 32 by a factor A2. The output signals of the multipliers 31 and 32 are compared in the comparators 33 and 34 with the deceleration signal b. The comparators 33 and 34 are followed by threshold value comparators 35 and 36, in which it is examined whether the output signal of the comparator 33 is smaller than or equal to 0 or whether the output signal of the comparator 34 is larger than 0 respectively. The output signals of the two comparators 35 and 36 are linked with one another in an AND gate 38, which emits the logic signal F indicating deceleration signal b is within the window.

By means of the window comparator 24, a value range of (BAR*A1-b) and (BAR * A2-b) is defined and examined as to whether the smoothed deceleration signal b is within this value range or window. The width and the position of this window with respect to the smoothed deceleration value b are determined by the factors A1 and A2. If the smoothed deceleration signal b is within the thus defined window, no correction of the braking prompt signal BAR is required. The signal F is emitted and changes the position of switch 22 to contact 30 and prevents memory 28 from storing a new correction signal K. If, on the other hand, the signal b is outside this window, the switch 22 will be in the position illustrated in FIG. 1, and the difference signal Δb, as as will be in the position illustrated in FIG. 1. The difference signal Δb modified by the factors K1 and K2 at switch output 26 is supplied to memory 28 by way of a gradient limiting circuit 25. Since the signal F supplied by the window comparator 24 is low, the memory 28 will then store by the factors K1 and K2, by way of a gradient limiting circuit 25, will be supplied to a memory 28 to whose control input the signal F is also supplied by the window comparator 24. The memory 28 will then store the gradient-limited differential signal Δb which is multiplied by the factors K1 or K2. The stored value is supplied as the correction signal K by way of a switch 52 to an input of the adder 5. The gradient limiting circuit 25 operates in the same manner as the jolt limiting circuit 3 and permits within a defined time period of, for example, two successive clock pulses, only a maximal change by a defined value.

The output signal K of the memory 28 is compared in a comparator 50 with a fixedly defined negative value−x. The output signal of the comparator 50 controls the switch 52. It is the purpose of this measure to permit negative correction values only to a fixedly defined value−x. The braking prompt signal BAR injected by the driver can therefore only be reduced by this value−x. This prevents, for example, a complete releasing of the brake in the case of an uphill braking. If the output signal K of the memory 28 is negative and mathematically smaller than the value−x, the switch from the position shown 52 is switched, and a fixed value−x is supplied to the corresponding input of the adder 5. The value−x can also be selected at zero if no corrections reducing the braking prompt BAR but only corrections are to be permitted which increase the braking prompt BAR.

If the output signal F of the window comparator 24 indicates that the smoothed deceleration signal b is within the window, the switch from the position shown 22 is switched, and the correction value K is maintained which was last stored in the memory 28. For this purpose, in the wiring diagram of FIG. 1, the output of the memory 28 is connected with the other input 30 of the switch 22, so that the output value of the memory 28 is supplied by way of the switch 22 and the gradient limiting circuit 25 to the input of the memory 28.

As a result, a correction value once determined during a "leaving" of the value range defined by the comparator 24 will be maintained until the smoothed vehicle deceleration b again leaves the defined value range.

The following is a further explanation of the value range of the window comparator:

If, for example, the constant A1 has the value 1.0 and the constant A2 has the value 1.1, the logic signal F emitted by the window comparator 4 will have the logical value "1" precisely when the value of the deceleration signal b is in a range between 1.0 times the value of the braking prompt signal BAR and 1.1 times the value of the signal BAR. When the smoothed deceleration signal b is outside this "tolerance range" defined by the two constants A1 and A2 as a function of the value of the signal BAR, the signal F emitted by the window comparator 24 will have the logical value "0", which corresponds to the illustrated position of the switch 22.

In the case of the control with the regulating intervention illustrated in FIG. 1, four different cases can occur which will be explained in the following, the constants A1 and A2, for example, having values "1.0" and "1.1". In addition, the de-scription of the four cases will relate to the position of the switch 52 illustrated in FIG. 1 (it is to be assumed that the value of the signal 29 is greater than the negative value "−x").

In a first case, it will be assumed that the smoothed deceleration signal b formed from the speed signal v is equal to 0.95 times the filtered braking prompt signal BAR; that is, the actual deceleration is smaller than the deceleration prompted by the driver, in which case the signal b is outside the tolerance band. In this case, the signal F has a logical value "0", so that the switch 22 is in the illustrated position and the memory element 28 is switched into a storage-ready condition. Since the actual deceleration of the vehicle is smaller than the deceleration prompted by the driver, the differential signal Δb will be positive and will therefore be multiplied in the multiplier 19 by the factor K1 and will be emitted as signal 21 by way of the switch 22 to the gradient limiting circuit 25.

Signal 26 increases its value with the gradient which is provided by the gradient limiting circuit 25. The memory 28 correspondingly increases its stored value. By way of the switch 52 in the illustrated position, this value is emitted as the correction value K and is added to the braking prompt signal BAR and the signal S rises correspondingly. The vehicle deceleration will rise, specifically as long as the supplied deceleration signal b is moving into the permissible value range of the window comparator 24, in which case its output signal F assumes the logical value "1". The switch 22 charges state to contact 30 and the value in the memory 28 will remain unchanged as long as the signal F has a logical value "1".

It will be assumed that, in case 2, the deceleration signal b will be increased in comparison to case 1 and will, for exam-ple, be equal to 1.05 times the braking prompt signal BAR and will therefore be within the tolerance range. In this case, signal F has the logical value "1" and switches the switch 22 to the contact 30 and simultaneously switches off the storage readiness of the memory element 28. Although, in this case, a differential signal $\Delta b$ and therefrom a signal 21 continue to be generated, this signal is not further processed. In this case, the value 29 of the preceding clock pulse filed in the memory 28 is again supplied to the adder 5 as the correction signal K and the output signal S is formed therefrom.

It is assumed that in the third case—for example, in a subsequent clock pulse—the smoothed deceleration signal b is equal to 1.2 times the filtered braking prompt signal BAR and is therefore again outside the tolerance band so that the switch 22 will be switched back again into the illustrated position and the memory element 18 is changed into the storage-ready condi-tion. The differential signal $\Delta b$ is negative in this case and is multiplied in the multiplier 20 by the factor K2. After passing through the gradient limiting circuit 25, the new value 29 is written into the memory 28 and is supplied as the correction signal K to the adder 5.

It is assumed that in a fourth case the smoothed decelera-tion signal b is equal to the filtered braking prompt signal BAR, so that the differential signal $\Delta b$ has the value "0" and the switch 15 switches, which has the result that no correction signal K at all is emitted. Thus, the output signal S is equal to the filtered braking prompt signal BAR.

In a supplementary manner, the control with the regulating intervention according to the inven-tion can be integrated into the overall brake system such that, in certain operating conditions, it is automatically or manually switched off by the switch 15 or can be switched off or overdriven by another component system, such as an antiskid system. A switching-off and an intervention of an antiskid system is useful, for example, when all axles of a vehicle or of a vehicle formation have the tendency to lock. This is achieved by input 16

Figure 2:
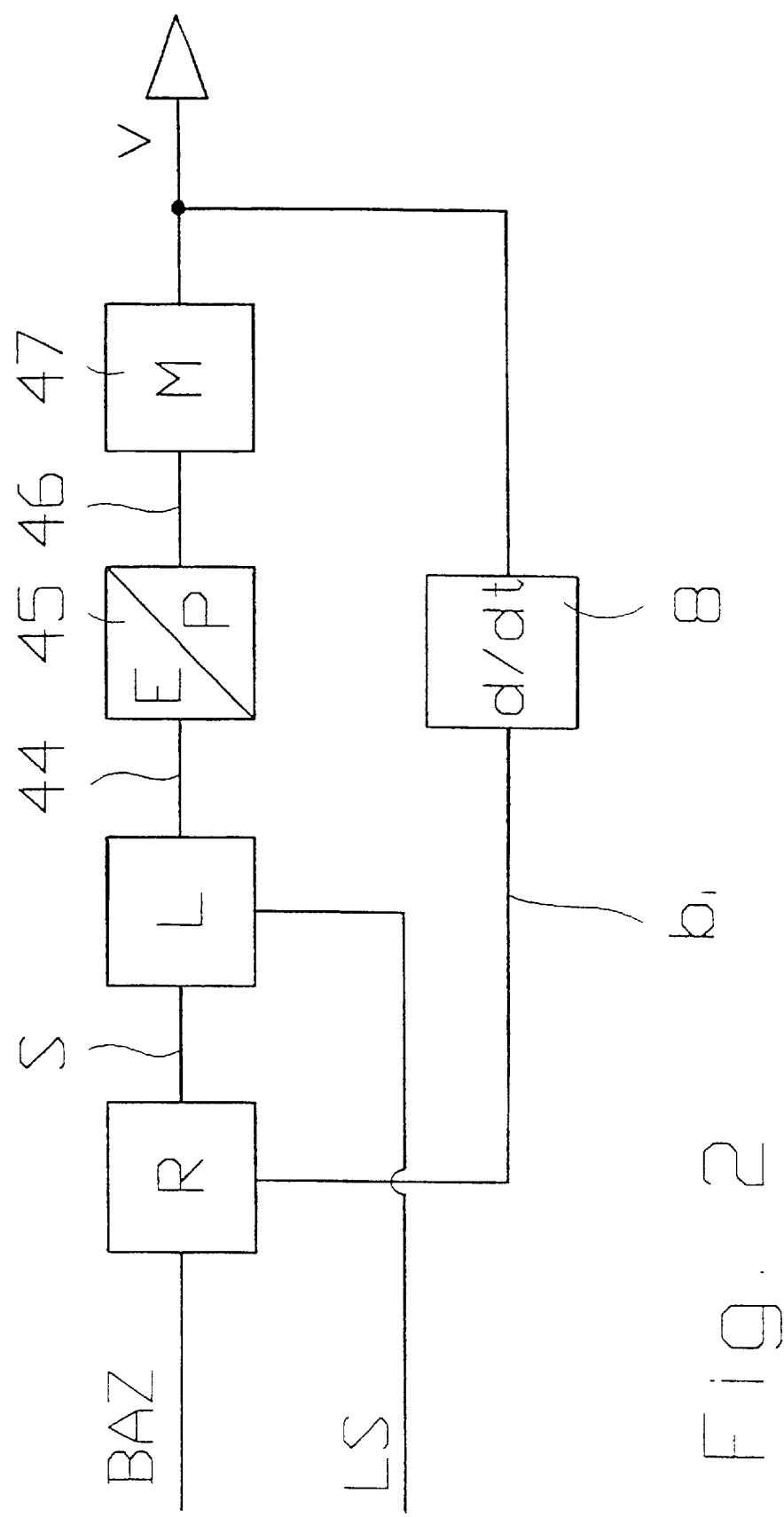
FIG. 2 is a schematic block diagram of a brake system of a vehicle which is equipped with a brake control according to the invention.

FIG. 2 is a schematic block diagram in which the decelera-tion control with the regulating intervention illustrated in FIG. 1 is a component of an overall vehicle brake system. In FIG. 2, the deceleration control with the regu-lating interven-tion illustrated in FIG. 1 is combined in a block marked R. The braking prompt signal BAZ defined by the driver is fed to the block R as well as the deceleration signal $b_i$ obtained from the vehicle speed v by differentiating in the differentiator 8. From the signals BAZ and $b_i$, the decelera-tion control with the regu-lating intervention generates the control signal S which is supplied to a load detection unit L. In addition, load signals LS are supplied to the load detection unit L, in the schematic representation of FIG. 2 only one signal path LS being shown.

When looking at a brake system of a train, the number of load signals LS, for example, corresponds to the number of bogies of the train; that is, the load to be carried by each bogie is processed. As a function of the possibly different loads of individual bogies, the load detection unit L generates a corre-sponding number of output signals 44, which are supplied to a converter 45.

The, for example, electro-pneumatic converter 45 converts the signals 44 into forces or pressures signal 96 which operate braking mechanisms 47 (such a brake cylinders or calipers) at the as-signed bogies, which causes a braking and therefore changes the speed v. From a new speed v occurring in the next clock pulse, a new deceleration b is calculated which is again supplied to the deceleration control with the regulating intervention R.

The additional detection of load signals ls is advantageous in order to, for example, prevent in the case of a train that the braking forces generated from the brake control signal s are supplied only to the brakes of one bogie while the other bogies remain unbraked. Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A brake control for vehicles comprising:

a generator which can be operated by the driver for generating a braking prompt signal;

a measuring device which generates a deceleration signal corresponding to the vehicle deceleration;

a filtering device in the measuring device which processes several successive time-discrete measured values of several successively measured deceleration signals to form the deceleration signal;

a window comparator which examines whether a difference between the braking prompt signal and the deceleration signal is within a predefined range and which generates an output signal corresponding to the result of this examination;

a correction value device which generates a correction signal corresponding to the difference between the braking prompt signal and the deceleration signal, and which modifies a previous correction signal only when the output signal of the window comparator indicates that the difference between the braking prompt signal and the deceleration signal is outside the predefined range; and a linking device which modifies the braking prompt signal by the correction signal to generate a brake controlling output signal.

2. A brake control according to claim 1 wherein the filtering device weights the measured values differently during a clock pulse.

3. A brake control according to claim 2, wherein the weighting takes place by different weighting factors, and measured values which were measured later in time are weighted higher than measured values which were measured earlier in time.

4. A brake control according to 1 wherein the correction value device includes a gradient limiting device which limits the variation in time of the correction signal to a defined amount.

5. A brake control according to claim 4, wherein the correction value device includes a memory device which stores a signal supplied by the gradient limiting device when the output signal supplied by the window comparator has a defined value.

6. A brake control according to claim 4 wherein the correction value device includes a regulating amplification device which amplifies a difference signal formed from the braking prompt signal and the deceleration signal to different degrees as a function of its preceding sign and supplies it to the gradient limiting device if the output signal generated by the window comparator has the defined value.

7. A brake control according to claim 1 wherein the correction value device has a limiting device which limits a correction signal, which is generated for reducing the braking prompt signal, to a defined amount.

8. A brake control according to claim 1 including a switching device which switches the correction value device on and off as a function of defined conditions, such as a vehicle speed, a value of an antiskid signal, a value of a brake signal, the types of mutually coupled vehicles, or the like.

9. A brake control according to claim 1 including a jolt limiting device is provided which generates the braking prompt signal from a signal supplied by the generator and which limits the variation in time of the braking prompt signal to a defined amount.

10. A brake control according to claim 1 wherein the correction value device includes a regulating amplification device which amplifies a difference signal formed from the braking prompt signal and the deceleration signal to different degrees as a function of its preceding sign and supplies it to the gradient limiting device if the output signal generated by the window comparator has a defined value.

11. A brake control according to claim 1 wherein the correction value device has a limiting device which limits a correction signal, which is generated for reducing the braking prompt signal, to a defined amount.

12. A method for controlling vehicle brakes, wherein a brake controlling brake output signal is generated from a braking prompt signal to be defined by a driver, the method comprising:

measuring the vehicle deceleration and generating a corresponding deceleration signal using several time-discrete measured values of several successively measured deceleration signals;

determining a difference between the braking prompt signal and the deceleration signal;

determining whether the difference is inside or outside a defined range;

generating a correction signal corresponding to the difference between the braking prompt signal and the deceleration signal;

modifying a previous correction signal only when the difference between the braking prompt signal and the deceleration signal is outside a defined range; and modifying the braking prompt signal using the correction signal.

13. A method according to claim 12, including differently weighting the measured values during a clock pulse.

14. A method according to claim 13, wherein a measured values which were measured later in time are weighted higher than measured values which were measured earlier in time.

15. A method according to claim 12 including limiting of the variation in time of the correction signal to a defined amount.

16. A method according to claim 15, including storing a possibly limited correction signal when the difference between the braking prompt signal (BAR) and the deceleration signal (b) is within the defined range.

17. A method according to claim 12, including amplifying a difference signal formed from the difference of the braking prompt signal and the deceleration signal, the difference signal being differently amplified as a function of its preceding sign.

18. A method according to claim 12 including limiting of a correction signal, which is generated for reducing the braking prompt signal, to a defined amount.

19. A method according to claim 12, wherein generating of the correction signal is carried out or not carried out as a function of defined conditions, such as a vehicle speed, a value of an antiskid signal, a value of a brake signal, the types of mutually coupled vehicles, or the like.

* * * * *